UNITED STATES PATENT OFFICE.

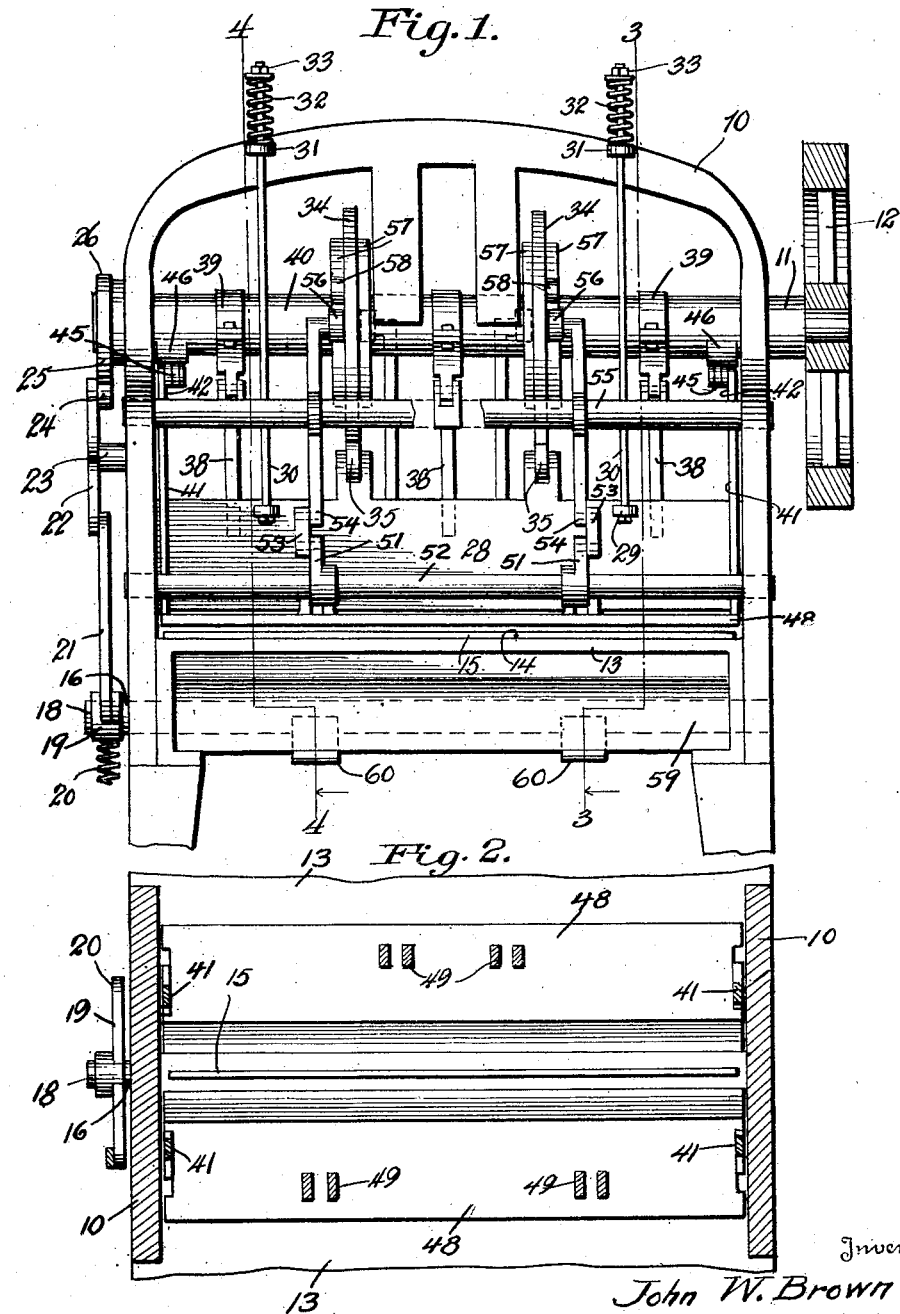

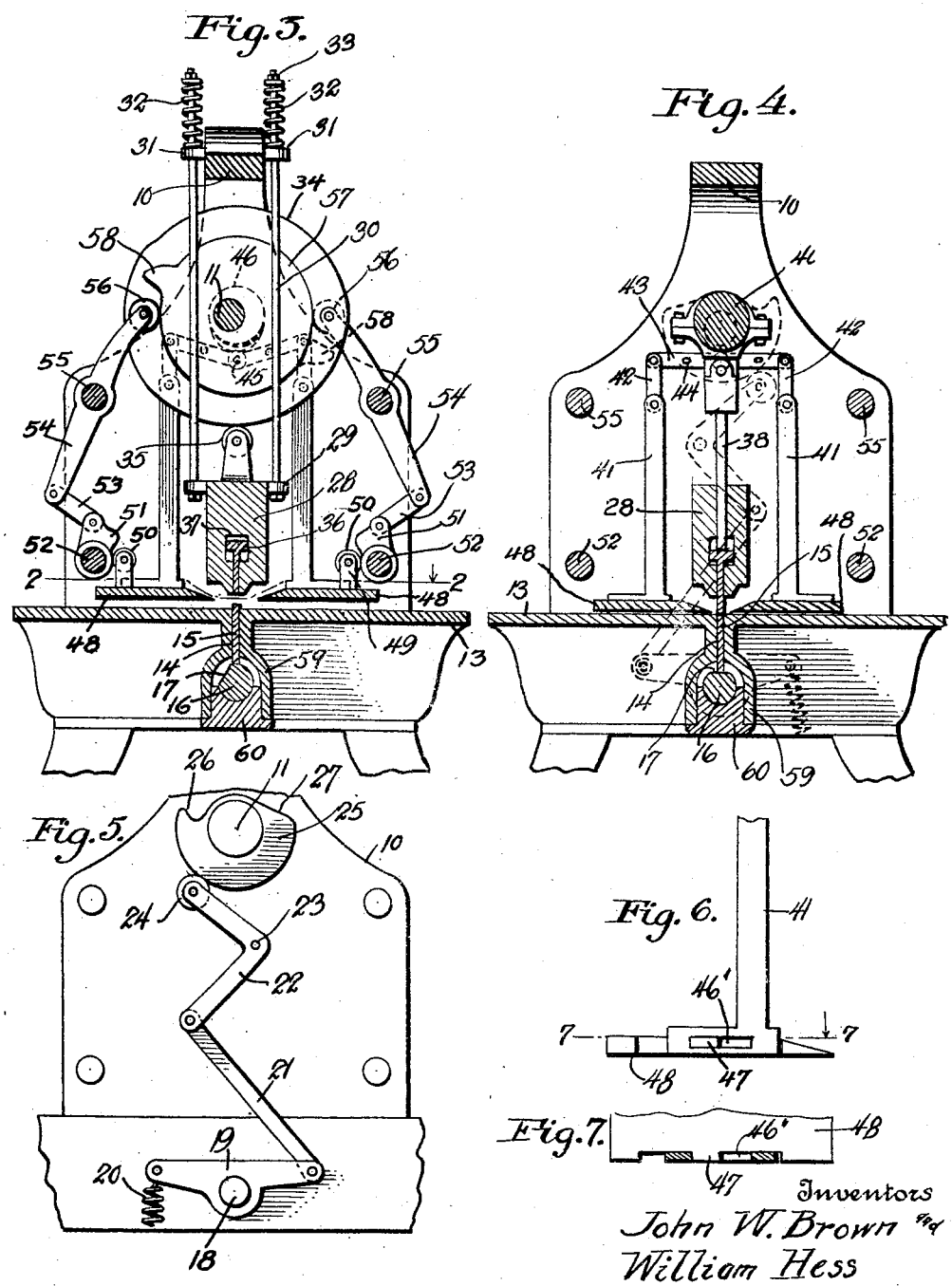

JOHN W. BROWN AND WILLIAM HESS, OF PHILADELPHIA, PENNSYLVANIA, ASSIGNORS, BY DIRECT AND MESNE ASSIGNMENTS, TO BENJAMIN P. OB-DYKE, INC., OF PHILADELPHIA, PENNSYLVANIA, A CORPORATION OF DELAWARE.

SHEET-METAL-SEAMING MACHINE.

1,378,651.      Specification of Letters Patent.      Patented May 17, 1921.

Application filed June 27, 1919. Serial No. 307,150.

*To all whom it may concern:*

Be it known that we, JOHN W. BROWN and WILLIAM HESS, citizens of the United States, residing at Philadelphia, in the county of Philadelphia and State of Pennsylvania, have invented certain new and useful Improvements in Sheet-Metal-Seaming Machines; and we do hereby declare the following to be a full, clear, and exact description of the invention, such as will enable others skilled in the art to which it appertains to make and use the same.

The present invention relates to machines for forming seams between sheets of metal and the like.

The object of the present invention is to provide an efficient sheet seaming machine which is automatic in operation, which embodies but relatively few working parts; wherein the various pressures are exerted in substantially direct lines against the seam forming members, and which is constructed to exert equal pressure throughout the length of the seam formed joining adjacent sheets.

Another object of the invention is to provide an efficient seam forming machine for joining sheets of metal to provide a seam which is sealed tight and which does not require the use of solder or other like sealing agents.

With these and further objects in view as will in part hereinafter become apparent and in part be stated, the invention comprises certain novel constructions, combinations and arrangements of parts as subsequently specified and claimed.

In the accompanying drawings,—

Figure 1 is an end elevation of a seaming machine constructed according to the present invention.

Fig. 2 is a transverse section through the same taken on the line 2—2 of Fig. 3.

Fig. 3 is a vertical section taken through one end of the machine on the line 3—3 of Fig. 1.

Fig. 4 is a similar view taken on the line 4—4 of Fig. 1.

Fig. 5 is a fragmentary elevation of one end of the machine showing the cam actuated rocker.

Fig. 6 is a detail, enlarged side elevation of one of the tuckers, and

Fig. 7 is a horizontal section taken through the same on the line 7—7 of Fig. 6.

Figure 8:
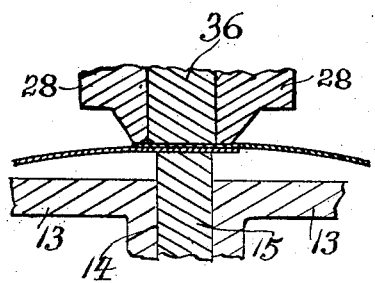
Figs. 8, 9, 10 and 11 are fragmentary sectional views of the parts in the successive positions assumed from the time of introduction of the sheets to be seamed to the completion of the seam.

Referring now to the drawings by numerals, 10 designates a frame of any approved construction, but which is preferably of arched open form and supporting therein a longitudinally extending shaft 11 journaled near its opposite ends through the end portions of the frame 10. A drive pulley 12 is suitably mounted on one end of the shaft 11 to turn it. Within the bottom of the frame 10 is seated a table 13 of suitable length to receive sheets of metal from one end of the machine and to support the sheets of metal at the other end of the machine after the seam is formed. The table 13 extends substantially throughout the length of the frame 10 and is provided between its ends, and in the vertical plane of the shaft 11, with a vertical guideway or slot 14 within which is mounted a core or former strip 15 which extends throughout the length of the table. The strip 15 is supported at its lower end upon a cam 16 which may be a round shaft and which has a flat face or side 17 upon which the lower edge of the forming strip 15 is adapted to rest, the side 17 permitting the strip 15 to drop sufficiently to lie flush at its upper edge with the upper surface of the table 13. The shaft 16 is journaled at opposite ends in the frame 10 and one end of the shaft 16 has an extension 18 upon which a rocker arm 19 is mounted. A spring 20 has one end connected to one end of the rocker arm 19 for urging the latter to turn in a direction to dispose the flat face 17 upward and normally admit the strip 15 to rest in a lowered position. The other end of the rocker arm 19 is pivoted to one end of a link 21 which has its other end pivoted to a bell crank lever 22 mounted on a pin 23 projecting from the adjacent end of the frame 10, and which carries on its free end a roller 24 adapted to bear against the surface of a cam 25 fixed upon the shaft 11. It will be noted that the cam 25 is concentric throughout substantially 180 degrees and that the cam is provided with an abrupt shoulder 26 adapted to permit the snapping of the roller 24 over the shoulder and against the eccentric face of the cam. Opposite the shoulder 26, the cam is provided with a relatively abrupt inclined face 27 adapted to quickly raise the roller 24 to the outer surface of the cam during the rotation of the shaft 11. The cam 25, therefore, controls the rocking of the shaft 16 and the raising and lowering of the forming strip 15.

Suspended in the frame 10 immediately over the forming strip 15 is a forming block 28 provided with outstanding lugs 29 at opposite sides and near opposite ends through which engage upwardly extending rods 30. The upper ends of the rods 30 pass through lugs 31 outstanding from the frame 10 and springs 32 surround the upper ends of the rods 30 and bear against the upper faces of the ears 31 to support the rods 30 and the head 28. Nuts 33 or the like are adjustably mounted upon the upper ends of the rods 30 for varying the height of the head 28 and for engagement with the upper ends of the springs 32 to yieldingly support the head 28. The lower side of the head 28 is provided with a longitudinally extending slot or recess adapted to register over the forming strip 15 and which is preferably slightly wider than the strip 15 to receive the overlapping edges of adjacent metal sheets as the latter are bent about the upper edge of the strip 15. The head 28 is raised and lowered relatively to the table 13 by a pair of cams 34 fixed upon the shaft 11 and receiving against the working face thereof rollers 35 which are mounted in brackets upstanding from the head 28. The springs 32 normally urge the head upward, and the cams 34 are adapted to project the rollers 35 downward during the rotation of the shaft 11. Any number of these cams 34 and rollers 35 may be used, but in the present instance but two are employed, the same being spaced apart intermediately of the ends of the frame 10.

Within the former head 28 is a hammer 36 which is of substantially T-shape with its head arranged in a longitudinally extending pocket or recess 37 formed in the lower portion of the head 28 and with the flange or web of the hammer projecting downwardly through the slot in the lower face of the head 28. The hammer 36 is adapted to be projected below the head 28 by impact of pressure of vertically movable rods 38 which are suspended from eccentric straps 39 mounted on eccentrics 40 carried by the shaft 11. As shown in Fig. 1, three such rods 38 are employed for operation upon the hammer 36 near the ends and at the intermediate portion of the latter. Thus, equal pressure is exerted upon the hammer 36 throughout the length thereof.

Arranged within and near each end of frame 10 are a pair of depending tucker supports 41. The upper end of each tucker support 41 is pivoted to a link 42 and the links 42 are carried upon the outer ends of rocker arms or levers 43 which are pivoted at 44 intermediate their ends upon the frame 10. The inner ends of the rocker arms 43 are provided with rollers 45 adapted to bear against the surface of a cam 46 on the shaft 11, there being provided a cam 46 at each end of the frame for operating upon the adjacent rollers 45. The lower ends of the supports 41 are horizontally enlarged and provided with elongated openings 46' through which project lugs 47 carried upon the opposite ends of tucker shoes 48, as shown in Figs. 6 and 7, for the purpose of supporting the shoes 48 horizontally and permitting the shoes to move toward and from each other on the lower ends of the supports 41. The shoes 48 are arranged at opposite sides of the former head 28 and have beveled adjacent ends providing relatively narrow edges adapted to engage the opposite sides of the seam for the purpose of tucking in the ends of the overlapping sheets. Each shoe 48 has near each end an upstanding bracket 49 carrying a roller 50 adapted to be engaged by a cam 51 on a rocker shaft 52 mounted in each side of the frame and which cam is adapted to be moved by a link 53 connecting the cam 51 to one end of a rocker arm 54 which is mounted to turn upon a rod 55 secured in the ends of the frame 10. Each arm 54 projects upwardly and carries a roller 56 at its upper end adapted to bear against a cam 57 on the shaft 11, each cam 57 having a lobe 58 at one side for engaging the roller and throwing the same outward to rock the cam 51 inward against the shoe roller 50. The depending supports 41 are raised and lowered by the cams 46 and the shoes 48 are moved inward by the cams 57, the timing of such operations being such as to simultaneously lower the shoes and move the same inwardly toward each other.

The table 13 is provided with a channel casing 59 open at its under side to receive the shaft 16 therein, and the casing is closed by a bearing block 60 fitted in the bottom of the casing and upon which the shaft 16 is adapted to rest. These blocks 60 may be of any desired number for supporting the shaft 16 throughout its length, and as shown in Fig. 1, two such blocks 60 are employed arranged near the opposite ends of the shaft.

In operation, the sheets of metal are placed upon the table 13 with their overlapping edges arranged immediately over the former strip 15. As the shaft 11 is turned, the cam 25 actuates the rocker arm 19 and causes the cam 16 to turn and raise the former strip 15 into a position slightly above the table 13 as shown in Fig. 3. Further operation of the shaft 11 causes the cams 34 to project the former head 28 downwardly and bend the overlapping thickness of the metal down about the upper edge of the strip 15. At this time the cam 25 releases the roller 24 and the spring 20 quickly returns the strip 15 to its normal position flush with the upper surface of the table 13. The cams 46 and 57 now come into operation for simultaneously moving the tucker shoes 48 downwardly toward the table and inwardly toward each other, the edges of the shoes striking the opposite sides of the bent over overlapping portions of the metal to bend the same inwardly toward each other and above the lowered strip 15. The shoes 48 are quickly retracted from the partially formed seam and the eccentrics 40 force the rods 38 downwardly against the hammers 36 to impact the hammers against the top of the seam and flatten it to crush the ends of the overlapping sheets down upon the body portions of the sheets and thus effectively form a seam which is sealed.

Figure 9:
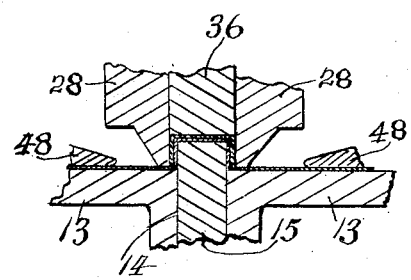
Figure 10:
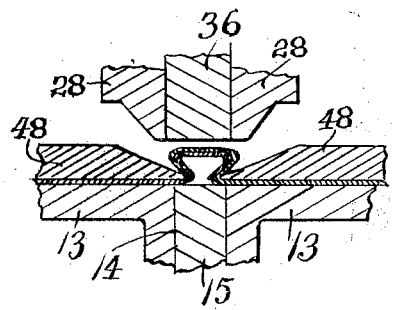
Figure 11:
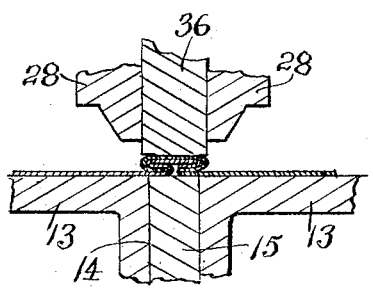

As best seen in Figs. 8, 9, 10 and 11, one complete cycle of operations consists of introducing overlapping sections of sheets in the manner indicated in Fig. 8 with the head 28 elevated and hammer 36 and forming strip 15 also elevated, and causing the parts to move through the successive steps indicated in Figs. 9, 10 and 11. These steps in detail involve the descent of the head 28 while the forming strip 15 remains elevated so that the sheets are bent to the position indicated in Fig. 9, forming an upstanding trough-like fold. The forming strip 15 then descends while the hammer 36 remains elevated, and the head 28 is elevated and the tucker shoes 48 move laterally inward to engage the line of jointure between the upstanding fold and the main portions of the respective sheets. The inward movement or tucking action of the tucker shoes produces the result shown in Fig. 10 with portions of the fold underlying other portions thereof. The tucker shoes then withdraw laterally, and the hammer 36 descends and collapses the portions of the fold to the position indicated in Fig. 11, which makes the complete seam.

We claim:—

1. In a seaming machine, the combination of a frame, a table on the frame to support metallic sheets with ends overlapping, a former mounted to rise through the table beneath the overlapping ends of the sheets, a former block suspended over the table above the former, tucker shoes arranged at opposite sides of the former block and bodily movable vertically and horizontally, means for raising said former, means for depressing the former block, means for advancing said tucker shoes downwardly toward the table and horizontally toward each other, a hammer in the former block, means for impacting the hammer toward said former, and a single operating device connected to all of said means for operating the same in sequence to form and seal the seam.

2. In a seaming machine, a frame having a table to support sheets of metal with ends overlapping, a cam mounted in the lower part of the frame, a former supported on the cam and adapted to be elevated thereby through the table, a block yieldingly supported in the frame over the table, a shaft journaled in the frame above the block, a cam on the shaft adapted to engage the block for depressing the same, a rocker arm on said cam beneath the table, a second cam on said shaft coöperatively arranged relatively to the rocker arm, a hammer carried by the block, an eccentric on said shaft, a thrust bar connected to the eccentric for engagement with the hammer to impact the same toward said former, tucker shoes suspended from the frame over the table at opposite sides of the block, a cam on the shaft for lowering said tucker shoes, another cam on the shaft for advancing said tucker shoes toward each other, and means for turning the shaft to operate said parts in sequence for forming and sealing a seam.

3. In a seaming machine, the combination of a frame having a table to support sheets of metal with ends overlapping, a former block suspended in the frame over the table, supports suspended in the frame at opposite sides of the block, tucker shoes slidably mounted on the supports for movement toward and from each other, means for lowering said supports, means for advancing said tucker shoes toward each other simultaneously with the lowering of the supports, a hammer carried by the block, and a common operating device adapted to actuate said former block, hammer, supports and tucker shoes in sequence for forming and sealing a seam.

4. In a seaming machine, a frame, a table on the frame, a former block suspended in the frame over the table, a hammer arranged in the former block, supports suspended in the frame at opposite sides of the block, a shaft journaled in the frame, cams on the shaft for depressing the former block and lowering said supports, tucker shoes slidably mounted on the lower ends of the supports, another cam on the shaft for advancing said tucker shoes toward each other when lowered, and a former mounted in the lower end of the frame and connected to said shaft and adapted to be raised thereby through said table.

5. In a seaming machine, the combination of a frame, a table on the frame, a former in the lower part of the frame adapted to be raised through the table, a former block suspended in the frame over the table, means for lowering the former block, a hammer in the former block, means for impacting the hammer toward said former, tucker shoes, vertically movable supports in the frame for the tucker shoes, means for actuating said supports to lower the tucker shoes toward the table, and means adapted to operate upon the tucker shoes for advancing the same toward each other beneath said block when the shoes are lowered.

In testimony whereof we affix our signatures in presence of two witnesses.

JOHN W. BROWN.
WILLIAM HESS.

Witnesses:
EDWARD BONSALL,
SAMUEL B. S. BARTH.